US009489972B2

(12) United States Patent
Honda et al.

(10) Patent No.: US 9,489,972 B2
(45) Date of Patent: Nov. 8, 2016

(54) LIGHT SOURCE UNIT, HEAT-ASSISTED MAGNETIC RECORDING HEAD USING THE SAME, AND LIGHT SOURCE FOR LIGHT SOURCE UNIT

(71) Applicants: SAE Magnetics (H.K.) Ltd., Hong Kong (CN); TDK Corporation, Tokyo (JP); ROHM CO., LTD., Kyoto (JP)

(72) Inventors: Takashi Honda, Hong Kong (CN); Seiichi Takayama, Hong Kong (CN); Ryuji Fujii, Hong Kong (CN); Koji Shimazawa, Tokyo (JP); Tsuguki Noma, Kyoto (JP); Yoshiteru Nagai, Kyoto (JP)

(73) Assignees: SAE MAGNETICS (H.K.) LTD., Hong Kong (CN); TDK CORPORATION, Tokyo (JP); ROHM CO., LTD., Kyoto (JP)

( * ) Notice: Subject to any disclaimer, the term of this patent is extended or adjusted under 35 U.S.C. 154(b) by 0 days.

(21) Appl. No.: 14/657,436

(22) Filed: Mar. 13, 2015

(65) Prior Publication Data
US 2016/0232928 A1    Aug. 11, 2016

(30) Foreign Application Priority Data
Feb. 6, 2015    (JP) .................................. 2015-022513

(51) Int. Cl.
*G11B 5/02*    (2006.01)
*G11B 5/48*    (2006.01)
*G01J 1/44*    (2006.01)
*G11B 5/00*    (2006.01)

(52) U.S. Cl.
CPC ................. *G11B 5/4866* (2013.01); *G01J 1/44* (2013.01); *G11B 2005/0021* (2013.01)

(58) Field of Classification Search
CPC ....... G11B 5/48; G11B 5/4826; G11B 5/486; G11B 5/4853; G11B 11/1058; G11B 2005/021; G11B 5/6005; G11B 5/314; G11B 23/0308
USPC .................. 369/44.12, 120, 121, 122, 13.24; 360/59, 234.4
See application file for complete search history.

(56) References Cited

U.S. PATENT DOCUMENTS 6,376,871 B1 *    4/2002    Arai ...................... H01L 31/103
                                                                     257/290
8,687,469 B1    4/2014    Takayama et al.

FOREIGN PATENT DOCUMENTS

JP    2013-062468    4/2013

\* cited by examiner

*Primary Examiner* — Nabil Hindi
(74) *Attorney, Agent, or Firm* — Nixon & Vanderhye PC

(57) ABSTRACT

A light source unit has a substrate, a light source that is mounted to the substrate. The light source includes; a first emission part that emits a forward light, the forward light being a laser light in an oscillation state; a second emission part that is located on a side opposite to the first emission part and that emits a rearward light, the rearward light being a laser light in an oscillation state; and a light leakage part located at a position different from the first emission part and the second emission part. The light source further includes a photodetector that is provided on the substrate, wherein the photodetector has a light receiving surface for detecting a leakage light that leaks from the light leakage part.

10 Claims, 10 Drawing Sheets

FIG.5A
FIG.5B
FIG.5C
FIG.5D
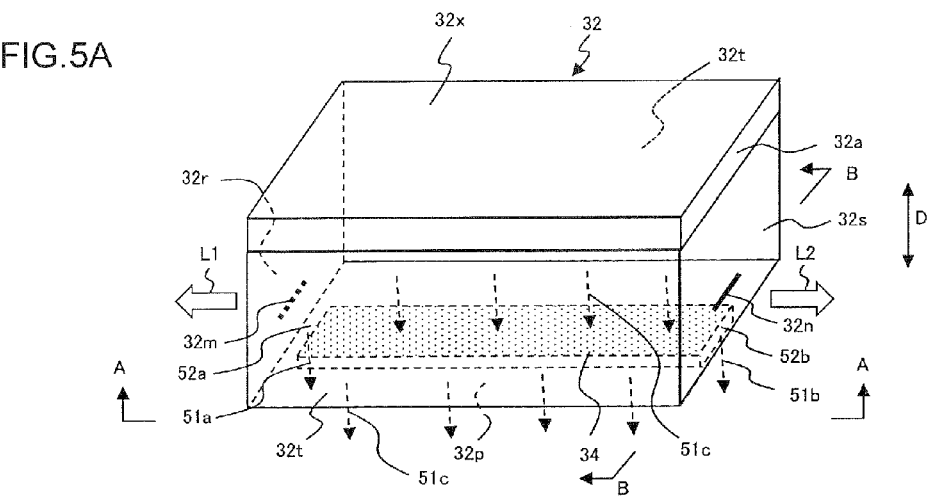
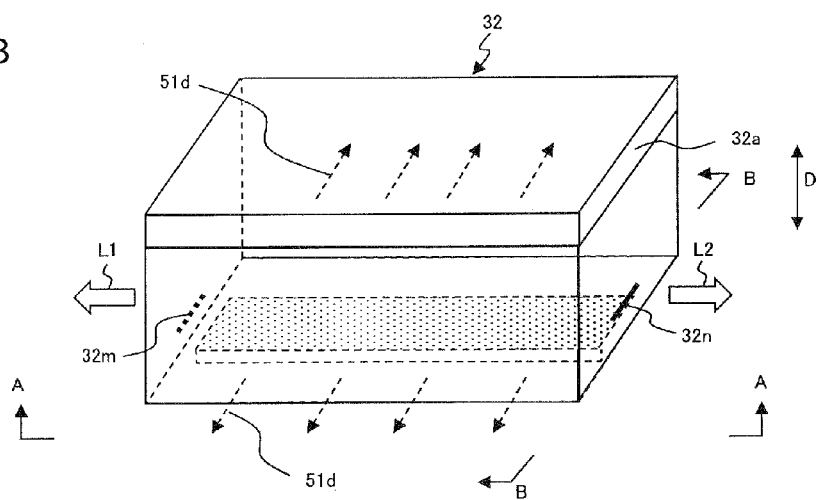
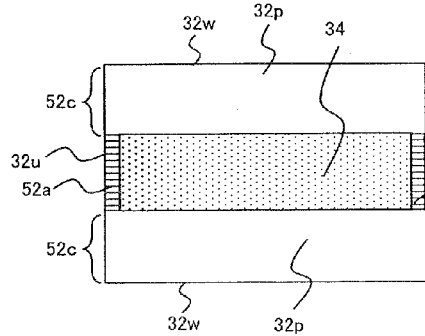
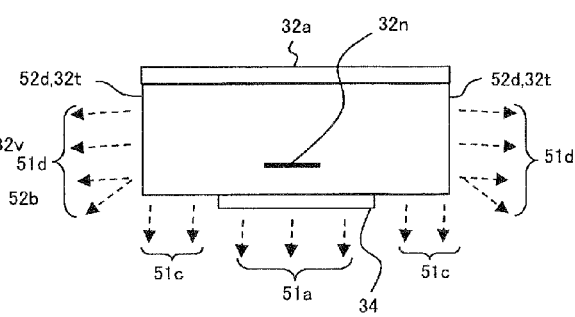

LIGHT SOURCE UNIT, HEAT-ASSISTED MAGNETIC RECORDING HEAD USING THE SAME, AND LIGHT SOURCE FOR LIGHT SOURCE UNIT

The present application is based on, and claims priority from, J.P. Application No. 2015-022513, filed on Feb. 6, 2015, the disclosure of which is hereby incorporated by reference herein in its entirety.

BACKGROUND OF THE INVENTION

The present invention relates to a light source unit, a heat-assisted magnetic recording head using the same and a light source for a light source unit, and more particularly relates to the arrangement of a photodetector of the light source unit.

There has been necessary to improve the performance of thin-film magnetic heads in connection with increasing the recording density of hard disk apparatuses. A magnetic recording medium is a discontinuous medium consisting of an aggregate of magnetic fine particles each having a single magnetic domain structure. Each recording bit on the magnetic recording medium is composed of a plurality of magnetic fine particles. In order to increase recording density, asperity of the border between adjacent recording bits needs to be reduced. To realize this reduction, the size of the magnetic fine particles needs to be decreased. On the other hand, the magnetization of small, fine particles, namely, magnetic fine particles small in volume, leads to reduced thermal stability. An effective solution to this problem is to increase the anisotropic energy of the magnetic fine particles. However, higher anisotropic energy of magnetic fine particles enhances coercivity of the magnetic recording medium, making it difficult to record information with the existing magnetic head.

So-called heat-assisted magnetic recording is proposed as a method for solving this problem. This method allows the use of magnetic recording media having high coercivity. When recording information, magnetic field and heat are simultaneously applied to an area of the magnetic recording medium where information is to be recorded, thereby raising the temperature of the area. In the area where coercivity has thus been decreased, the magnetic field enables information to be recorded. Hereinafter, a magnetic head used for heat-assisted magnetic recording will be called a heat-assisted magnetic recording head.

The heat-assisted magnetic recording head disclosed in U.S. Pat. No. 8,687,469 has a magnetic head slider that records information on a magnetic recording medium and a light source unit that is fixed to the magnetic head slider and that supplies laser light to the magnetic head slider. The light source has an edge emitting-type laser diode mounted on a substrate. The edge emitting-type laser diode emits laser light (forward light) from a surface that faces the magnetic head slider, and at the same time, emits laser light (rearward light) from the back surface. The magnetic head slider has near-field light generation means. The near-field light generation means propagates the forward light that is emitted from the light source unit and generates near-field light on the air bearing surface. The near-field light generation means has a waveguide for propagating the forward light and a plasmon generator for generating the near-field light.

The plasmon generator tends to reach high temperatures, causing not only damage to itself but also damage, cracks, etc. to the dielectric body that surrounds the plasmon generator. It is therefore necessary to properly control the output of the forward light. U.S. Pat. No. 8,687,469 and JP2013-62468A disclose a light source unit that has a photodetector on the back surface side of a laser diode. Since the ratio of light intensity between the forward light and the rearward light is previously known, it is possible to control the light intensity of the forward light by measuring the light intensity of the rearward light.

The photodetectors disclosed in U.S. Pat. No. 8,687,469 and JP2013-62468A are provided on the substrate at a predetermined distance from the laser diode (hereinafter, "light source") in order to detect the rearward light. Thus, the substrate needs to be of a certain size for the light source and the photodetector to be mounted on it in series, and it is difficult to realize a compact light source unit. Accordingly, reducing the weight of the light source unit also becomes difficult. Even if the photodetector is provided on a separate substrate, reducing the weight of the light source is still difficult because another substrate for the photodetector is required. The hard disk apparatus has an arm that rotates in the radial direction of the magnetic recording medium, and the magnetic head slider is mounted at the leading end of the arm. Thus, an increase in the weight of the light source unit has a large impact on the performance of the rotation of the arm.

An object of the present invention is to provide a light source unit that can be easily made compact.

SUMMARY OF THE INVENTION

A light source unit of the present invention comprises a substrate, a light source that is mounted to the substrate. The light source includes; a first emission part that emits a forward light, the forward light being a laser light in an oscillation state; a second emission part that is located on a side opposite to the first emission part and that emits a rearward light, the rearward light being a laser light in an oscillation state; and a light leakage part located at a position different from the first emission part and the second emission part. The light source further includes a photodetector that is provided on the substrate, wherein the photodetector has a light receiving surface for detecting leakage light that leaks from the light leakage part.

In the present invention, instead of detecting the light intensity of the rearward light, leakage light that leaks from the light leakage part is detected. Since the intensity of the leakage light is correlated with the intensity of the forward light, the intensity of the forward light can be estimated by detecting the leakage light. It is possible to detect the leakage light, which leaks from the light leakage part, near the light source. Therefore, the photodetector can be arranged closer to the light source than in the conventional examples and a compact light source unit can be realized.

As has been described, according to the present invention, it is possible to provide a light source unit that can be easily made compact.

BRIEF DESCRIPTION OF THE DRAWINGS

FIGS. 5A-5D are schematic views showing types of leakage lights and positions where leakage lights occur;

DETAILED DESCRIPTION OF THE PREFERRED EMBODIMENTS

First Embodiment

Figure 1:
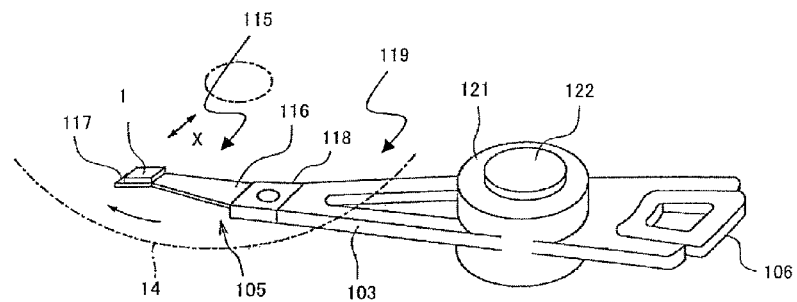
FIG. 1 is a perspective view showing a head arm assembly of a hard disk apparatus.

A heat-assisted magnetic recording head having a light source unit of the present invention is applied to a hard disk apparatus. FIG. 1 is a perspective view showing a head arm assembly of a hard disk apparatus. Head arm assembly 119 has head gimbal assembly 115 and arm 103 on which head gimbal assembly 115 is mounted. Head gimbal assembly 115 includes heat-assisted magnetic recording head 1 and suspension 105 that elastically supports heat-assisted magnetic recording head 1. Suspension 105 has load beam 116 that is formed of stainless steel and that has a flat spring shape, flexure 117 that is provided at one end of load beam 116 and baseplate 118 that is provided at the other end of load beam 116. Heat-assisted magnetic recording head 1 is bonded to flexure 117 and is given a moderate degree of freedom. Baseplate 118 is mounted at one end of arm 103. At the other end of arm 103, coil 106 that constitutes a part of a voice coil motor is mounted. Bearing part 121 is provided at the intermediate part of arm 103. Arm 103 is rotatably supported by shaft 122 that is mounted on bearing part 121 and drives heat-assisted magnetic recording head 1 in cross-track direction x of magnetic recording medium 14.

Figure 2:
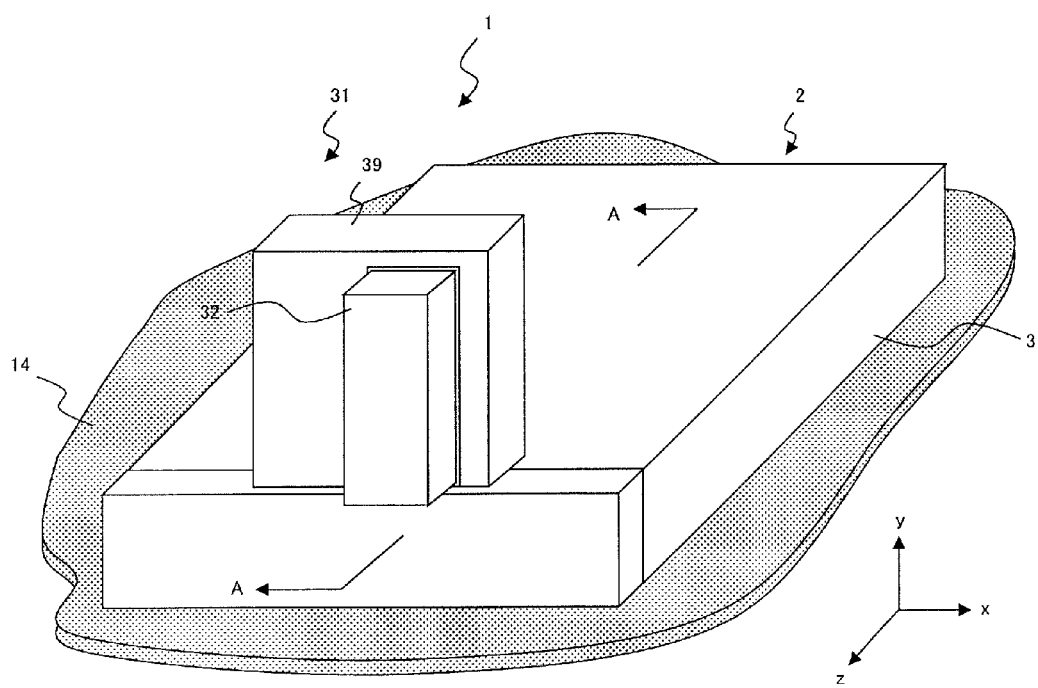
FIG. 2 is a perspective view of a heat-assisted magnetic recording head.
Figure 3:
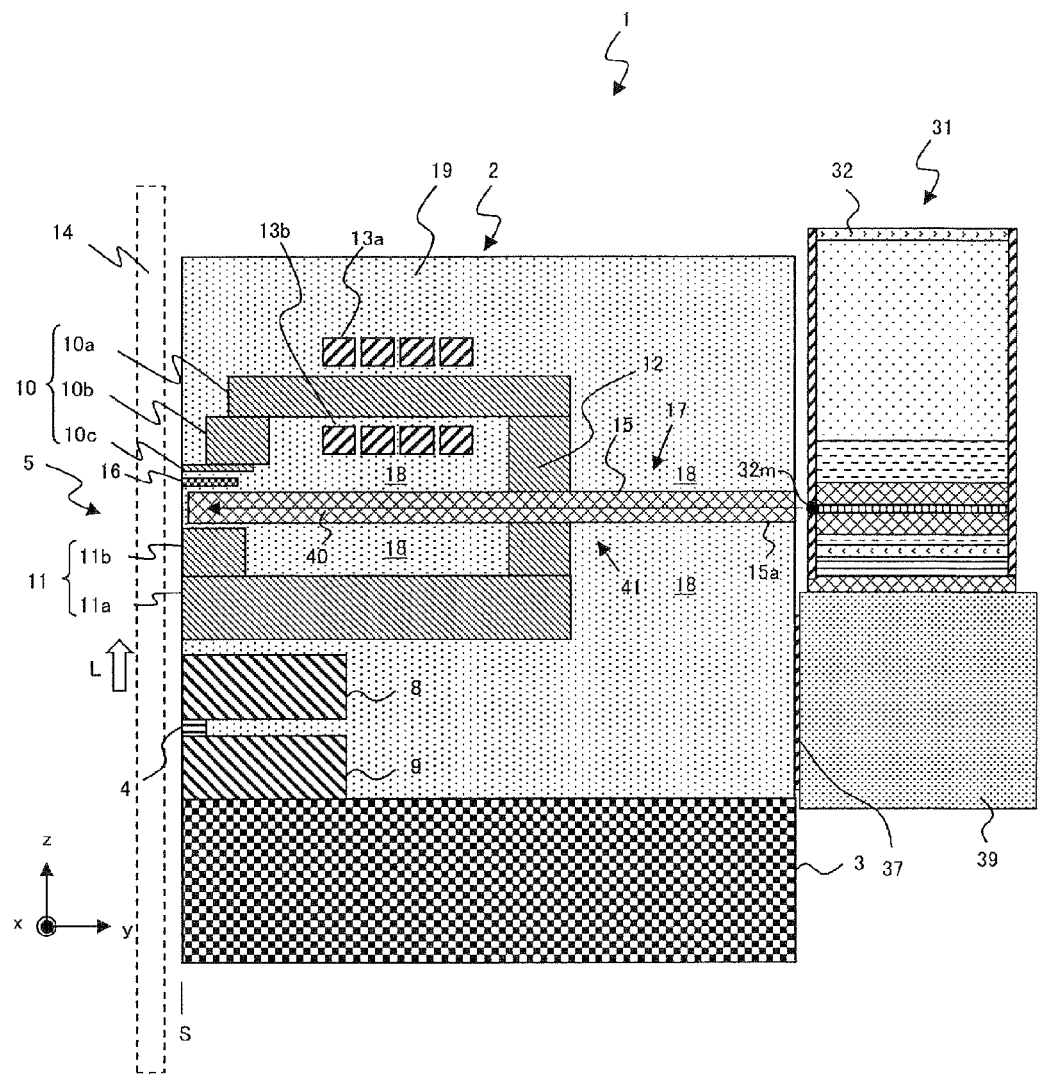
FIG. 3 is a cross-sectional view of the heat-assisted magnetic recording head.
Figure 4:
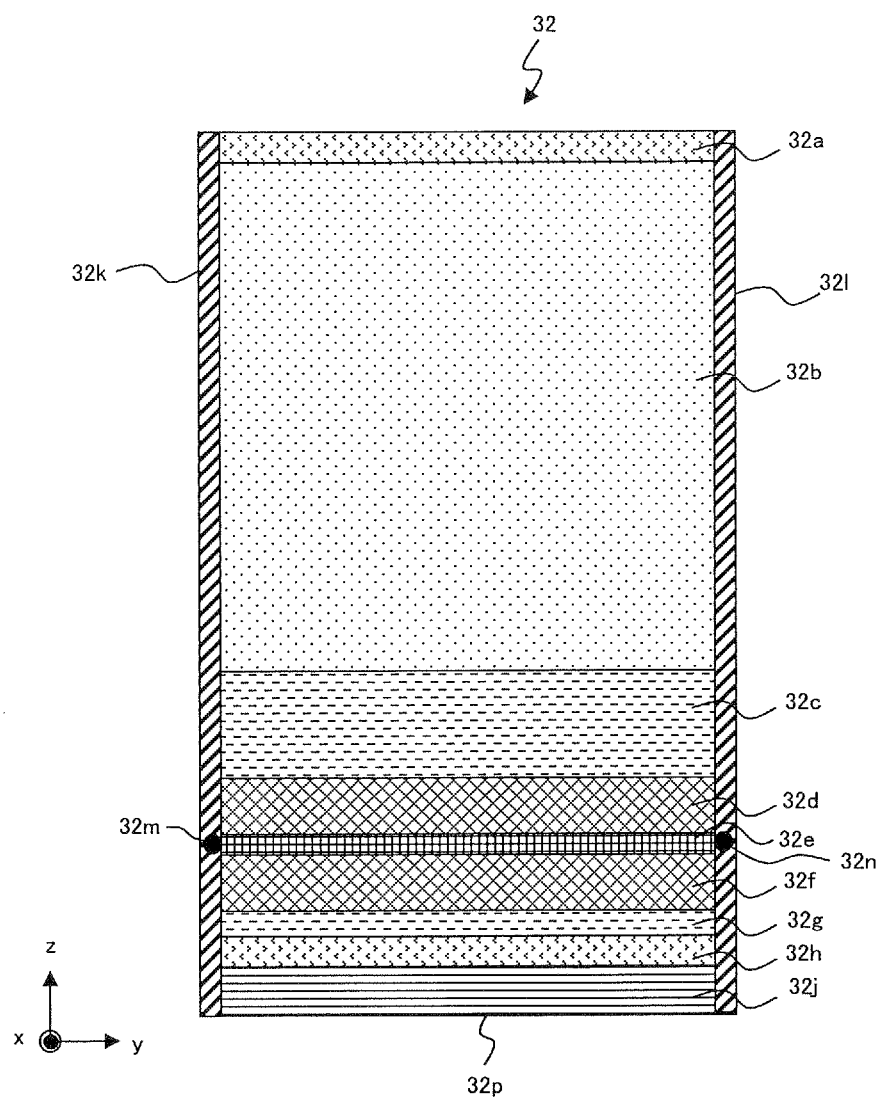
FIG. 4 is a cross-sectional view of a light source (laser diode)

FIG. 2 is an overall perspective view of the heat-assisted magnetic recording head. FIG. 3 is a cross-sectional view of the heat-assisted magnetic recording head cut along line A-A of FIG. 2. FIG. 4 is an enlarged cross-sectional view of the laser diode shown in FIG. 3.

Heat-assisted magnetic recording head 1 has magnetic head slider 2 and light source unit 31 that is fixed to magnetic head slider 2. Magnetic head slider 2 has a substantially hexahedral shape, and one of the surfaces forms air bearing surface S that faces magnetic recording medium 14. Magnetic head slider 2 has MR (Magneto Resistive) element 4, magnetic recording element 5 and near-field light generation means 41. Magnetic recording element 5 includes recording magnetic pole 10 for recording. Near-field light generation means 41 propagates laser light, which is emitted from light source unit 31, in the form of propagation light and generates near-field light on air bearing surface S from the propagation light. Recording magnetic pole 10 is provided adjacent to near-field light generation means 41 and has one end that lies on air bearing surface S. These elements are formed on substrate 3.

Light source unit 31 faces the surface of magnetic head slider 2 that is opposite to air bearing surface S. Light source unit 31 emits laser light in the direction perpendicular to air bearing surface S toward waveguide 17 of magnetic head slider 2. Light source unit 31 is connected to magnetic head slider 2 by means of bonding layer 37.

Magnetic head slider 2 has MR element 4 that has an exposed leading end part located on air bearing surface S. Magnetic head slider 2 has upper shield layer 8 and lower shield layer 9 that sandwich MR element 4 from the upper and lower sides with regard to stacking direction L. These elements configure a reproducing head part. Any configuration that utilizes the magnetoresistive effect may be applied to MR element 4. Such a configuration includes a CIP (Current In Plane)-GMR (Gigantic Magneto Resistive) element in which a sense current flows in the direction (x-direction) parallel to the film surface, a CPP (Current Perpendicular To Plane)-GMR (Gigantic Magneto Resistive) element in which a sense current flows in the direction (z-direction) perpendicular to the film surface and a TMR (Tunneling Magneto Resistive) element that utilizes the tunneling effect. In the case where a CPP-GMR element and a TMR element are applied, upper shield layer 8 and lower shield layer 9 are also used as electrodes for supplying a sense current.

Magnetic head slider 2 includes magnetic recording element 5 that constitutes a recording head part. Magnetic recording element 5 is used for so-called perpendicular magnetic recording. Magnetic recording element 5 has magnetic pole 10 for recording. Magnetic pole 10 for recording is provided adjacent to plasmon generator 16, which will be described later. Magnetic pole 10 for recording has first main body part 10a, second main body part 10b and magnetic pole leading end part 10c. These parts are formed, for example, of an alloy that is composed of at least two elements selected from Ni, Fe, and Co. Magnetic pole leading end part 10c, which is the end part of recording magnetic pole 10, lies on air bearing surface S. Return shield layer 11 is provided on the lower side of recording magnetic pole 10 with regard to stacking direction L. Return shield layer 11 has first main body part 11a and second main body part 11b. These parts are also formed, for example, of an alloy that is composed of at least two elements selected from Ni, Fe, and Co. Recording magnetic pole 10 and return shield layer 11 are magnetically coupled with each other at contact part 12. Overcoat layer 19 composed of $Al_2O_3$ is provided on the upper side of recording magnetic pole 10 with regard to the stacking direction.

Coils 13a, 13b are wound around recording magnetic pole 10 with contact part 12 in the center. FIG. 3 only illustrates the part of the coils that is located on the side of air bearing surface S with regard to contact part 12. A current that is applied from the outside to coils 13a, 13b generates a magnetic flux in recording magnetic pole 10. Coils 13a, 13b are formed of a conductive material, such as Cu.

Magnetic recording medium 14 has a configuration for perpendicular magnetic recording. The magnetic flux released from magnetic pole leading end part 10c enters magnetic recording medium 14 and magnetizes each recording bit in the perpendicular direction. The magnetic flux turns the flux path in the in-plane direction (z-direction) of magnetic recording medium 14, and further turns the flux path in the perpendicular direction (y-direction) near return shield layer 11 before being absorbed into return shield layer 11.

Magnetic head slider 2 has near-field light generation means 41 that generates near-field light. Near-field light generation means 41 includes core 15, clad 18 that covers core 15 and plasmon generator 16. Core 15 is able to propagate the laser light, which is generated in light source unit 31, in the form of propagation light 40. Clad 18 has a lower refractive index than core 15. Plasmon generator 16 extends along core 15 to air bearing surface S while facing a part of core 15 and generates near-field light on air bearing surface S. Core 15 extends from the end part of magnetic head slider 2, which faces light source unit 31, to or extends to the vicinity of air bearing surface S. Core 15 and clad 18 constitute waveguide 17.

Core 15 extends between recording magnetic pole 10 and return shield layer 11. While core 15 terminates near air bearing surface S, it may extend to air bearing surface S. Although not shown, clad 18 is provided between core 15 and contact part 12.

Clad 18 may be formed of, for example, $SiO_2$, and core 15 may be formed of, for example, $Al_2O_3$. In the case where clad 18 is formed of $Al_2O_3$, core 15 may be formed of, for example, tantalum oxide (TaOx). TaOx means any composition of tantalum oxide, which is typically, but not limited to, $Ta_2O_5$, TaO, $TaO_2$, etc.

The laser light generated in light source unit 31 propagates across core 15 in the form of propagation light 40. Heat-assisted magnetic recording head 1 generates near-field light on air bearing surface S by means of near-field light generation means 41, thereby heating an area of magnetic recording medium 14 where information is to be recorded. The following methods may be used as near-field light generation means 41; a method of allowing a plate-like conductive member to directly generate near-field light by the propagation light that propagates across the core; and a method of allowing the illustrated plasmon generator 16 to indirectly generate near-field light. In the following description, an embodiment using plasmon generator 16 will be described.

Plasmon generator 16 extends to air bearing surface S while facing a part of core 15. Plasmon generator 16 is formed of Au, Ag, Cu, Al, Pd, Ru, Pt, Rh, Ir, or an alloy mainly composed of these metals. In this embodiment, plasmon generator 16 is a metal piece having the shape of a substantially square column and a rectangular cross-section. Accordingly, the leading end surface of plasmon generator 16 is rectangular, but it may have another shape, such as a square or a triangle. Of the four side surfaces of plasmon generator 16 that extend in the y-direction, the surface that faces core 15 constitutes a light propagating surface. The light propagating surface couples with propagation light 40 that propagates across core 15 in a surface plasmon mode and thereby generates surface plasmon. The light propagating surface propagates the generated surface plasmon to the leading end surface on the air bearing surface side of plasmon generator 16 and generates near-field light on the leading end surface.

Light source unit 31 includes substrate 39 that is made of silicon and light source 32 that is mounted to substrate 39. Light source 32 is an edge emitting-type laser diode and those commonly used for communication, optical disk storage or material analysis, such as InP, GaAs, and GaN diodes, may be used. The wavelength of the laser light emitted is not particularly limited, but wavelengths within the range of 375 nm to 1.7 μm may be used. As shown in FIG. 5A, light source 32 has a generally rectangular parallelepiped shape. Light source 32 has substrate facing surface 32p (lower surface) that faces substrate 39, upper surface 32x that is opposite to substrate facing surface 32p, first side surface 32r having first emission part 32m, second side surface 32s having second emission part 32n and two third side surfaces 32t each adjacent to first and second side surfaces 32r, 32s. Substrate facing surface 32p of light source 32 has a rectangular shape having a long axis that extends in the light emitting direction of forward light L1.

Light source 32 of one example is configured by sequentially stacking n-electrode 32a, n-GaAs substrate 32b, n-InGaAlP clad layer 32c, first AlGaAs guide layer 32d, active layer 32e composed of a multiple quantum well (GaAs/AlGaAs) etc., second AlGaAs guide layer 32f, p-InGaAlP clad layer 32g, p-electrode seed layer 32h and p-electrode 32j, although the configuration of light source 32 is not limited to the above. First guide layer 32d may be formed of InGaAlP, active layer 32e may be formed of a multiple quantum well of InGaP/InGaAlP, and second guide layer 32f may be formed of InGaAlP. N-electrode 32a may be formed of an approximately 0.1 μm-thick Au or Au alloy layer formed on n-GaAs substrate 32b. Reflection layer (half mirror) 32k is formed on the cleavage surface of light source 32 that faces magnetic head slider 2, and reflection layer (full mirror) 32l is formed on the cleavage surface on the opposite side. The light generated in light source 32 repeats total reflections between reflection layer 32k and reflection layer 32l, reaching a resonance or oscillation state, before it is emitted from reflection layer 32k, which faces magnetic head slider 2, as forward light L1. Part of the light is also emitted from reflection layer 32l as rearward light L2. Thus, the end surface of active layer 32e that faces magnetic head slider 2 constitutes first emission part 32m which emits forward light L1, while the end surface of active layer 32e lying on the opposite side constitutes second emission part 32n that lies on a side opposite to first emission part 32m and that emits rearward light L2. P-electrode seed layer 32h and p-electrode 32j are only formed in a region where first bonding layer 34, described later, is formed so that a part of p-InGaAlP clad layer 32g faces substrate 39 and is exposed to substrate 39.

In this embodiment, light source 32 is mounted to substrate 39 in an orientation in which p-electrode 32j faces substrate 39. This is for the following reasons. Generally, in an edge emitting-type laser diode, active layer 32e lies closer to p-electrode 32j than to n-electrode 32a when viewed in the stacking direction of the light source. Therefore, self-generated heat of light source 32 can be efficiently dissipated by mounting light source 32 to substrate 39 such that the p-electrode, which is closer to active layer 32e that generates the largest heat during operation, is arranged as the bottom surface (junction-down).

Since light source 32 is a semiconductor element, even when the same current is supplied, the light intensity varies widely due to the variation of semiconductor elements. Therefore, it is desirable to determine a current that optimizes the laser light output during initial setting of a hard disk apparatus that incorporates heat-assisted magnetic recording head 1 and to supply the current, determined during the initial setting, to light source 32 in the subsequent operations. In a conventional edge emitting-type laser diode, the intensity of forward light L1 that is emitted from first emission part 32m is evaluated by detecting the intensity of rearward light L2 that is emitted from second emission part 32n. Forward light L1 and rearward light L2 are laser lights in resonance states. Such lights are called first LD light in this specification. On the other hand, when the first LD light is produced, part of light that is repeatedly reflected inside light source 32 and that reaches a resonance state is reflected on reflection layer 32k and reflection layer 32l, propagates in light source 32 and is released to the outside of light source 32. Such light is called second LD light in this specification. Moreover, there is light that is not in a resonance state inside light source 32. Such light is called LED light in this specification. The second LD light mainly leaks from light leakage parts 52a-52b, which are different from but adjacent to first emission part 32m and second emission part 32n. The LED light leaks from light leakage parts 52a-52d, which are different from first emission part 32m and second emission part 32n. The second LD light and the LED light constitute leakage lights 51a-51d of the present invention. In other words, leakage lights 51a-51b are composed of the second LD light and the LED light, while leakage lights 51c and 51d are substantially composed of the LED light. In the present invention, the intensity of leakage lights 51a-51d that leak from light source 32 is measured, and the intensity of the forward light that is emitted from first emission part 32m is controlled based on the measurement.

FIGS. 5A-5D are schematic views showing types of the leakage lights and positions where leakage lights occur. FIGS. 5A and 5B are perspective views of light source 32 seen from the same direction, and each figure shows different types of leakage lights. FIG. 5C is a bottom view of the light source seen from line A-A of FIGS. 5A and 5B. FIG. 5D is a side view of the light source seen from line B-B of FIGS. 5A and 5B. Light leakage parts 52a-52d, from which leakage lights 51a-51d leak, are located at positions different from first emission part 32m and second emission part 32n. As will be described later, first bonding layer 34 is formed on p-electrode 32j in order to bond light source 32 to substrate 39. The leakage light does not leak from first bonding layer 34 that covers p-electrode 32j.

When light source 32 is observed independently, the LED light leaks to the outside of light source 32 from various parts (light leakage parts 52a-52d) of light source 32. As shown in FIGS. 5A, 5C, and 5D, some of the major light leakage parts are first light leakage part 52a and second light leakage part 52b. First light leakage part 52a and second light leakage part 52b lie on both sides of first bonding layer 34 with regard to the longitudinal direction thereof. In first light leakage part 52a and second light leakage part 52b, p-electrode seed layer 32h, p-electrode 32j and first bonding layer 34 are not formed. First light leakage part 52a extends along first side 32u of substrate facing surface 32p, wherein first side 32u is a side close to first emission part 32m. Second light leakage part 52b extends along second side 32v of substrate facing surface 32p, wherein second side 32v is a side close to second emission part 32n. First light leakage part 52a and second light leakage part 52b are belt-shaped areas having a width of 10 µm or less measured from first side 32u and second side 32v, respectively. First leakage light 51a leaks from first light leakage part 52a, and second leakage light 51b leaks from second light leakage part 52b. First leakage light 51a includes part of the second LD light and part of the LED light and leaks from first light leakage part 52a. Second leakage light 51b includes part of the second LD light and part of the LED light and leaks from second light leakage part 52b.

As shown in FIGS. 5A, 5C, and 5D, another light leakage part is third light leakage parts 52c that lie on both sides of first bonding layer 34 with regard to the short direction. In third light leakage parts 52c, p-electrode seed layer 32h, p-electrode 32j and first bonding layer 34 are not formed. Third light leakage parts 52c extend along two third sides 32w of substrate facing surface 32p, wherein each third side 32w intersects both first side 32u and second side 32v, and wherein first side 32u is a side close to first emission part 32m and second side 32v is a side close to second emission part 32n. Third leakage light 51c, which is the LED light, leaks from third light leakage parts 52c.

As shown in FIGS. 5B and 5D, another light leakage part is fourth light leakage parts 52d that lie on third and fourth side surfaces 32t of light source 32. Fourth leakage light 51d, which is the LED light, leaks from fourth light leakage parts 52d.

Figure 6A:
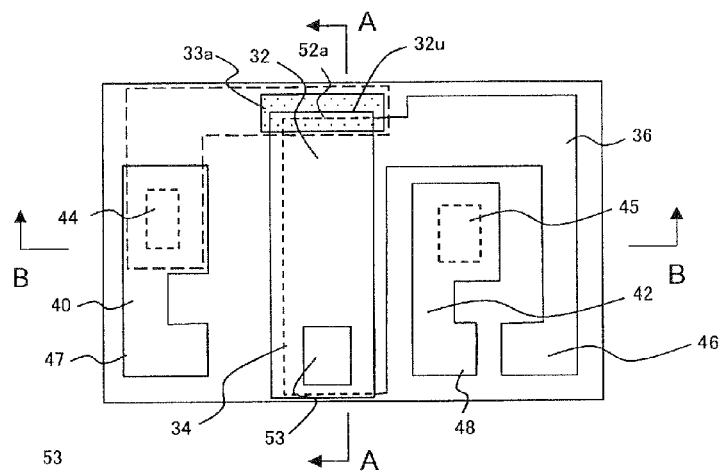
FIG. 6A is a plan view of a light source unit according to a first embodiment.
Figure 6B:
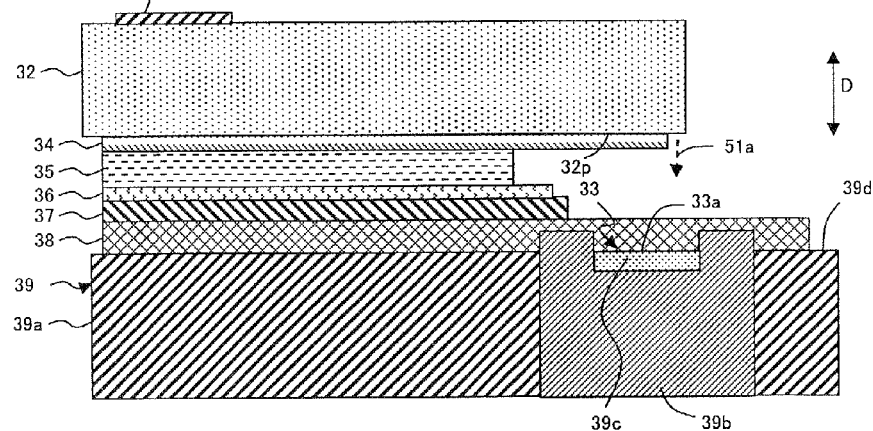
FIGS. 6B and 6C are cross-sectional views of the light source unit according to the first embodiment.
Figure 6C:
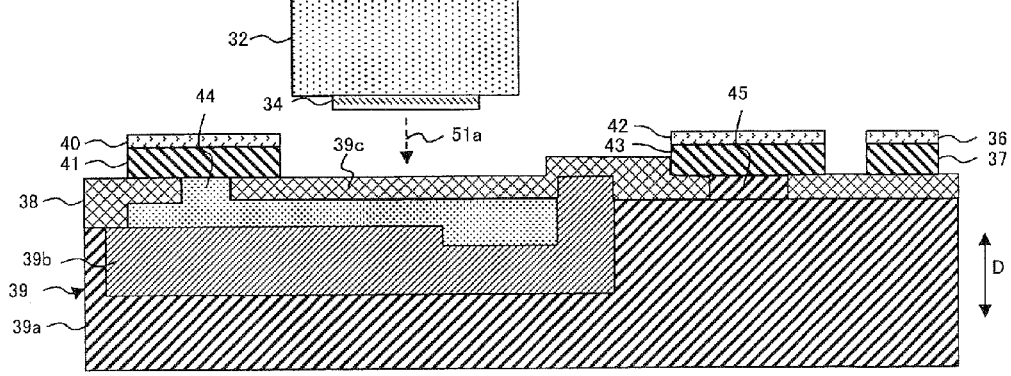

FIGS. 6A-6C are a plan view and cross-sectional views of the light source unit according to the first embodiment. FIG. 6A is a plan view, FIG. 6B is a cross-sectional view cut along line A-A of FIG. 6A, and FIG. 6C is a cross-sectional view cut along line B-B of FIG. 6A. For clarity of the view, part of wiring is omitted in the center of the substrate in FIG. 6C. Light source facing surface 39d of substrate 39 that faces light source 32 is covered with insulation layer 38 composed of $SiO_2$. Wiring layer 36, composed of Au, is provided on insulation layer 38 via heat dissipation layer 37 composed of Al. Heat dissipation layer 37 and wiring layer 36 extend on insulation layer 38 in a U-shape from beneath light source 32 to pad 46. Second bonding layer 35, composed of AuSn, is provided on the surface of wiring layer 36 that faces light source 32. Substrate facing surface 32p of light source 32 that faces substrate 39, namely, the surface of p-electrode 32j of light source 32, is covered with first bonding layer 34. First bonding layer 34 may be formed of Au, Ag, Cu, etc. First bonding layer 34 and second bonding layer 35 are thermally fused and bonded with each other. This bonding is an Au—Sn bonding. Pad 46 is connected with an electric wire (not shown) by means of appropriate means, such as wire bonding. The electric wire is provided in head gimbal assembly 115 that supports heat-assisted magnetic recording head 1. The upper surface of light source 32, namely, n-electrode 32a is also provided with pad 53, which is similarly connected with an electric wire (not shown) of head gimbal assembly 115 by appropriate means, such as wire bonding. During operation of the hard disk apparatus, power is supplied from a power source inside the hard disk apparatus to light source 32 through pads 46, 53, p-electrode 32j and n-electrode 32a.

In order to detect the intensity of the LED light, light source unit 31 has photodetector 33. Photodetector 33 is a photodiode. Photodetector 33 includes first light receiving surface 33a for detecting first leakage light 51a that leaks from first light leakage part 52a. In this embodiment, the intensity of the second LD light and the LED light, which is generated near first emission part 32m, is measured and the intensity of the forward light that is emitted from first emission part 32m is controlled based on the measurement. In this embodiment, when viewed in direction D that is perpendicular to substrate 39, first side 32u of light source 32 faces first light receiving surface 33a. When viewed in direction D that is perpendicular to substrate 39, first light receiving surface 33a stretches across a region immediately under first light leakage part 52a and a region outside first light leakage part 52a. A part of the width of first light receiving surface 33a lies immediately under first light leakage part 52a, but the entire width of first light receiving surface 33a may be located immediately under first light leakage part 52a. In this embodiment, when viewed in direction D that is perpendicular to substrate 39, first light receiving surface 33a extends beyond third side 32w of substrate facing surface 32p to the outside of light source 32 so that fourth leakage light 51d can be further detected. The LED light does not have directivity, unlike forward light L1 and rearward light L2, and diffuses over a wide area. It is therefore not necessary for first light receiving surface 33a to be located immediately under first light leakage part 52a. It is not necessary that the entire surface of first light receiving surface 33a faces first light leakage part 52a, as long as at least part of first light receiving surface 33a overlaps first light leakage part 52a when viewed in direction D that is perpendicular to substrate 39.

Photodetector 33 is formed on substrate 39. Light receiving surface 33a is formed on the upper surface of substrate 39. Substrate 39 has $n^+$ type (high-concentration n-type) layer 39a, $n^-$ type (low-concentration n-type) layer 39b and p-type layer 39c that is formed on $n^-$ type layer 39b. $N^+$ type layer 39a and p-type layer 39c are insulated from each other by $n^-$ type layer 39b. $N^+$ type layer 39a is connected with pad 48 (cathode electrode) via connection part 45, heat dissipation layer 43 and wiring layer 42. P-type layer 39c is connected with pad 47 (anode electrode) via connection part 44, heat dissipation layer 41 and wiring layer 40. A region of p-type layer 39c that faces light source 32 forms light receiving surface 33a.

Light receiving surface 33a of photodetector 33 is flush with light source facing surface 39d of substrate 39. That is, photodetector 33 is embedded in substrate 39. However, light receiving surface 33a of photodetector 33 may protrude toward the light source 32 from light source facing surface 39d of substrate 39.

Second Embodiment

Figure 7A:
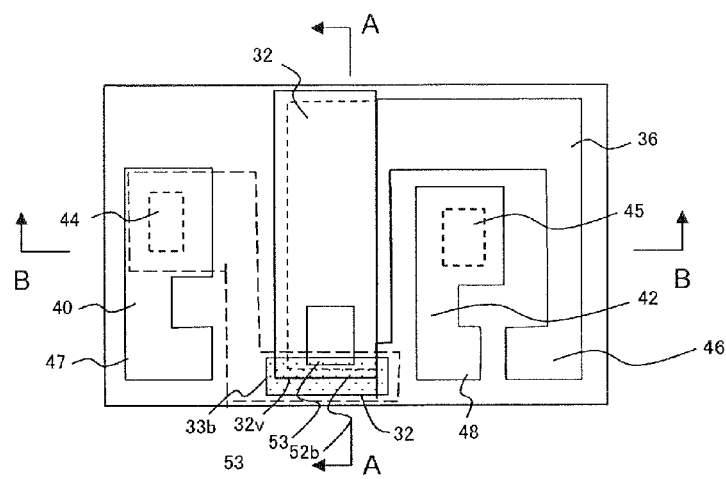
FIG. 7A is a plan view of a light source unit according to a second embodiment.
Figure 7B:
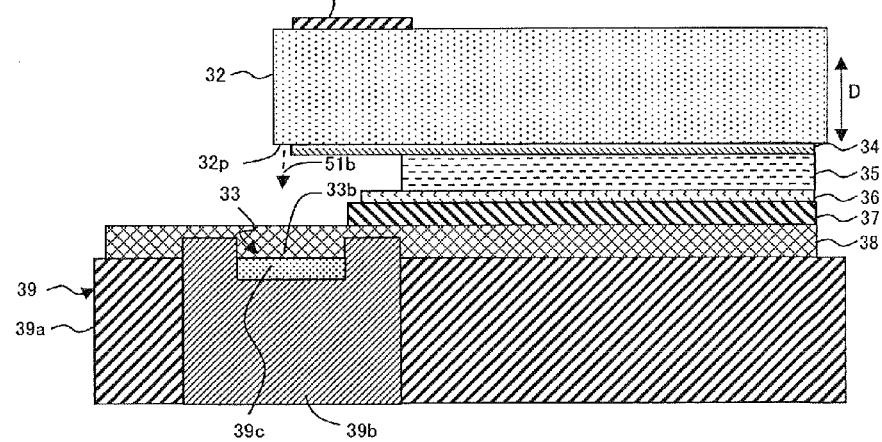
FIGS. 7B and 7C are cross-sectional views of the light source unit according to the second embodiment.
Figure 7C:
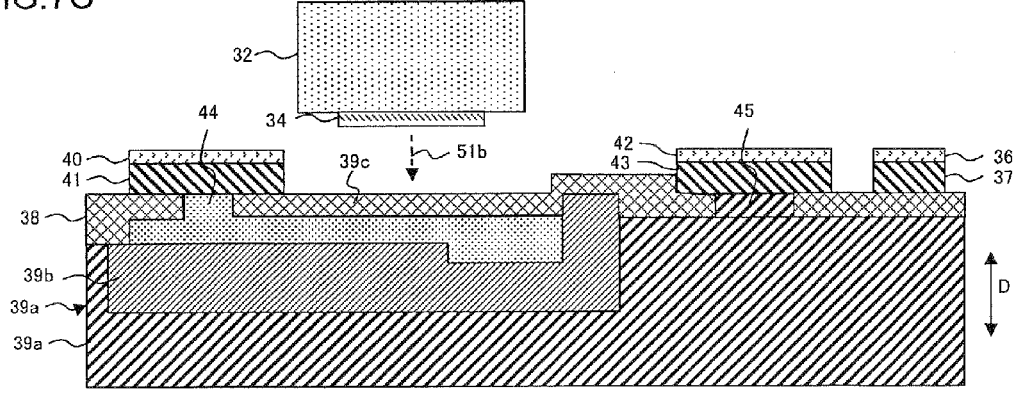

FIGS. 7A-7C are views, similar to FIGS. 6A-6C, showing light source unit 31 according to a second embodiment of the present invention. Configurations not described below are the same as those of the first embodiment. The second embodiment is the same as the first embodiment except that second light receiving surface 33b of photodetector 33 lies near second emission part 32n. In this embodiment, at least part of second light receiving surface 33b overlaps second light leakage part 52b when viewed in direction D that is perpendicular to substrate 39. In this embodiment, the intensity of the LD light and the LED light, which is generated near second emission part 32n, is measured and the intensity of the forward light that is emitted from first emission part 32m is controlled based on the measurement. In this embodiment, when viewed in direction D that is perpendicular to substrate 39, second side 32v of light source 32 faces second light receiving surface 33b. When viewed in direction D that is perpendicular to substrate 39, second light receiving surface 33b stretches across the region immediately under second light leakage part 52b and the region outside second light leakage part 52b. A part of the width of second light receiving surface 33b lies immediately under second light leakage part 52b, but the entire width of second light receiving surface 33b may be located immediately under second light leakage part 52b. In this embodiment, when viewed in direction D that is perpendicular to substrate 39, second light receiving surface 33b extends to the outside of light source 32 beyond third side 32w of substrate facing surface 32p so that fourth leakage light 51d can be further detected.

Third Embodiment

Figure 8A:
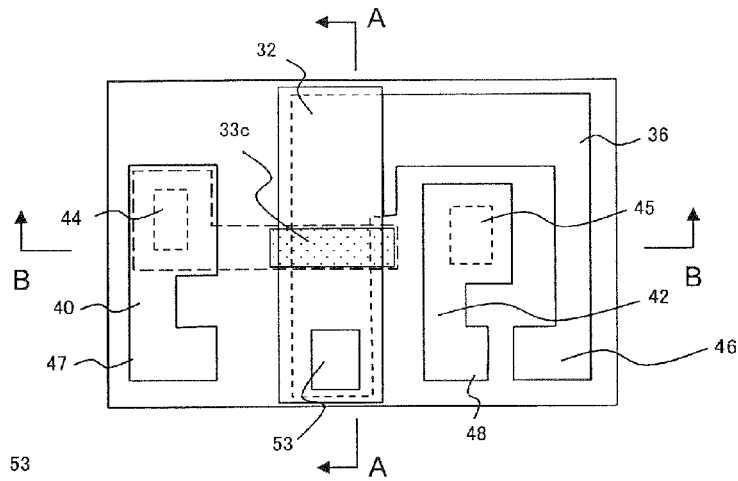
FIG. 8A is a plan view of a light source unit according to a third embodiment.
Figure 8B:
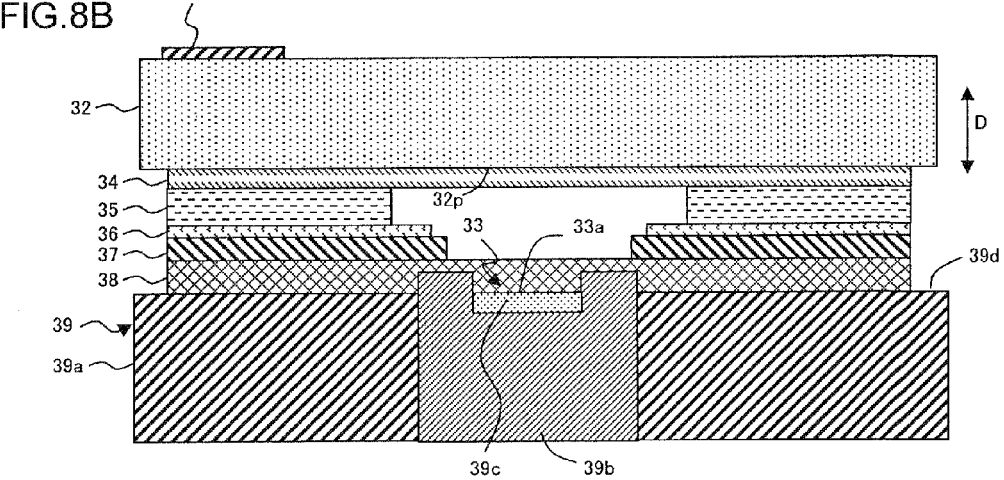
FIGS. 8B and 8C are cross-sectional views of the light source unit according to the third embodiment.
Figure 8C:
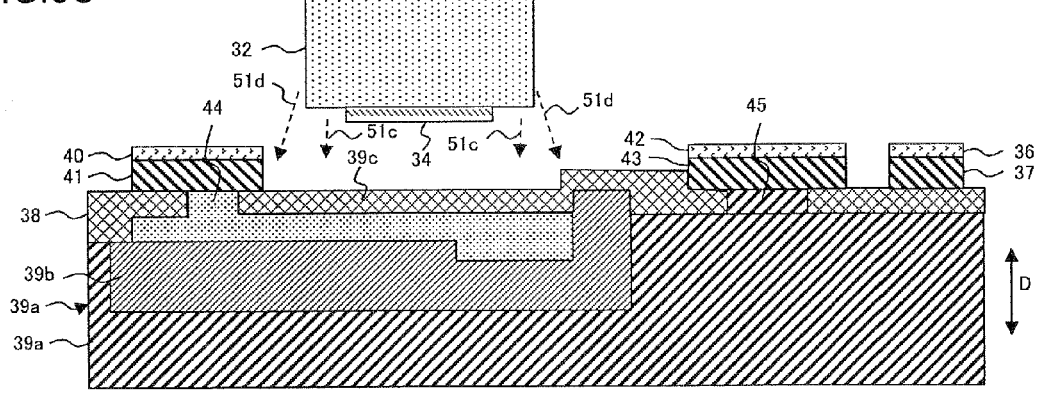

FIGS. 8A-8C are views, similar to FIGS. 6A-6C, showing light source unit 31 according to the third embodiment of the present invention. Configurations not described below are the same as those of the first embodiment. In this embodiment, in order to detect third leakage light 51c, at least part of third light receiving surface 33c of photodetector 33 overlaps third light leakage part 52c when viewed in direction D that is perpendicular to substrate 39. Thus, third leakage light 51c can be detected. In this embodiment, third light receiving surface 33c traverses light source 32 in the short direction thereof at the central portion with regard to the longitudinal direction thereof. However, the shape and width of third light receiving surface 33c and the direction in which third light receiving surface 33c extends are not limited to this example. In this embodiment, when viewed in direction D that is perpendicular to substrate 39, third light receiving surface 33c extends to the outside of light source 32 so that fourth leakage light 51d can be further detected.

Fourth Embodiment

Figure 9A:
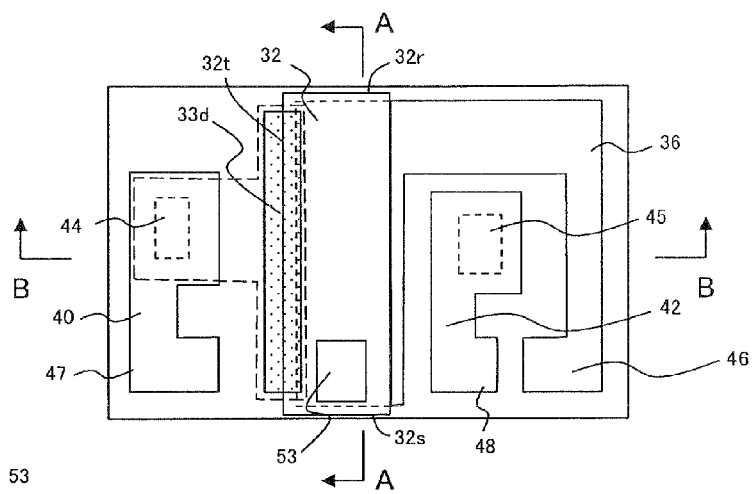
FIG. 9A is a plan view of a light source unit according to a fourth embodiment.
Figure 9B:
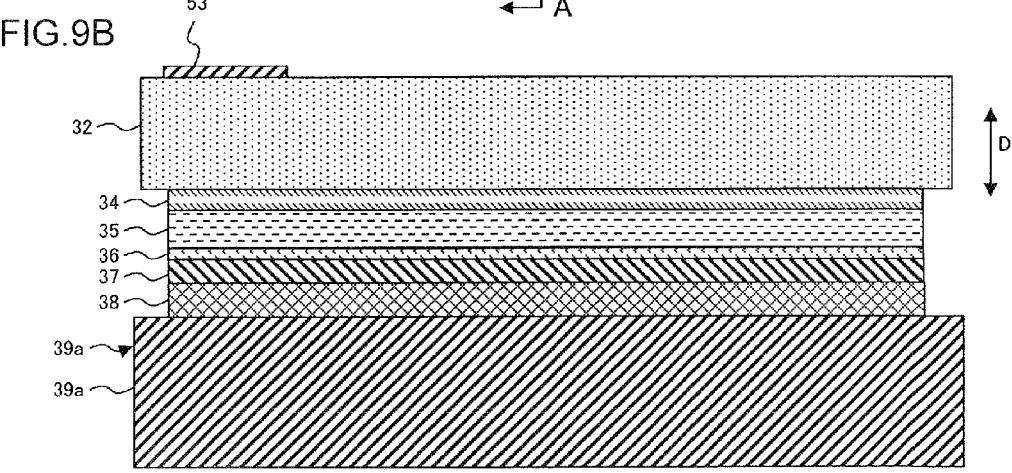
FIGS. 9B and 9C are cross-sectional views of the light source unit according to the fourth embodiment.
Figure 9C:
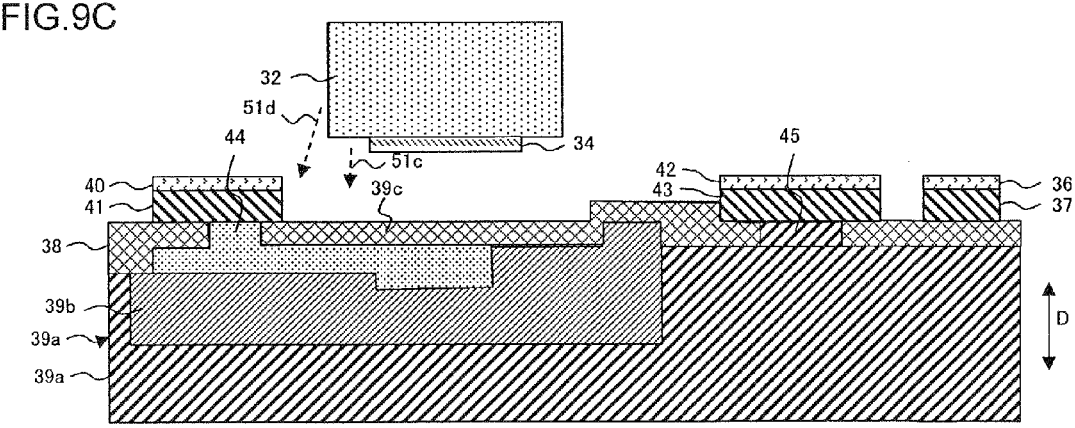

FIGS. 9A-9C are views, similar to FIGS. 6A-6C, showing light source unit 31 according to the fourth embodiment of the present invention. Configurations not described below are the same as those of the first embodiment. In this embodiment, when viewed in direction D that is perpendicular to substrate 39, at least part of fourth light receiving surface 33d of the photodetector 33 lies outside of light source 32 with regard to third side surface 32t of light source 32. Fourth light receiving surface 33d of photodetector 33 extends along third side surface 32t of light source 32. Fourth light receiving surface 33d can detect fourth leakage light 51d that leaks from third side surface 32t (fourth light leakage part 52d) of light source 32. In this embodiment, since fourth light receiving surface 33d is provided substantially over the entire length of light source 32, the leakage light that leaks along the long side of light source 32 can be effectively detected. Fourth light receiving surface 33d may also be provided inside of light source 32, when viewed in direction D that is perpendicular to substrate 39, so that not only fourth leakage light 51d, but also third leakage light 51c that leaks from third light leakage part 52c can be detected. While fourth light receiving surface 33d of photodetector 33 is provided on the left side of light source 32 in FIG. 9A, it may be provided on the right side or on both sides.

In any of the above-described embodiments, it is possible to stack the photodetector and the light source with regard to the direction perpendicular to the substrate. Conventionally, the dimension of the light source unit is determined as the sum of the length of the light source, the length of the light receiving surface of the photodetector and any additional lengths that may be required. On the other hand, the dimension of the light receiving surface has virtually no influence on the dimension of the light source unit in the first and second embodiments. The dimension of the light receiving surface has substantially no influence on the dimension of the light source unit in the third and fourth embodiments.

EXAMPLE

Figure 10:
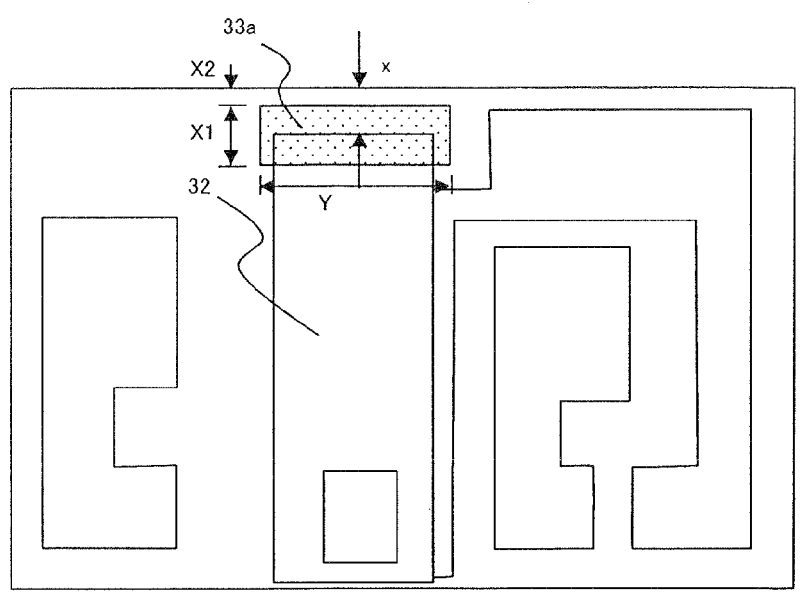
FIG. 10 is a plan view of a light source unit used in an example.
Figure 11A:
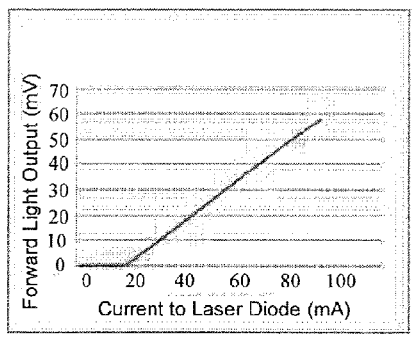
FIG. 11A is a graph showing the relationship between current to a laser diode and light output characteristics in the example.

Using the arrangement of the photodetector of the first embodiment, the relation between the relative positional relationship of the photodetector and the light source and measurement of light intensity of the photodetector was obtained. FIG. 10 shows a plan view of the light source unit used for the measurement. To simplify the view, only the reference numerals of light receiving surface 33a of the photodetector and light source 32 are shown. For reference numerals of the other portions, see FIG. 6A. The dimensions of the light receiving surface are X1=70 µm and Y=140 µm, as shown in the figure. Distance X2 between the light receiving surface and the edge of the substrate is 30 µm. The relative positions of the photodetector and the light source are indicated by x in FIG. 10. Reference sign x denotes the distance between the edge of the substrate and the edge of the light source. When the sign of x is positive, the light source is located inside the substrate, and when it is negative, the light source protrudes from the substrate. The light source was moved relative to the substrate and the relationship between the current applied to the light source and the current detected by the photodetector was measured. FIG. 11A shows the relationship between the current applied to the light source and the light intensity of the first LD light (forward light L1). FIGS. 11B to 11E show the relationship between the current applied to the light source and the current detected by the photodetector in terms of various dimensions x. The same relationship between the current applied to the light source and the light intensity of the first LD light (forward light), shown in FIG. 11A, is applied to FIGS. 11B to 11E.

FIG. 11A shows that oscillation occurs and intense LD light is emitted when the current exceeds a predetermined value (about 20 mA in the example).

Figure 11B:
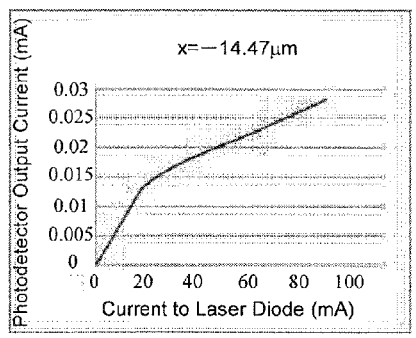
FIGS. 11B to 11E are graphs showing the relationship between current to the laser diode and an output current of a photodetector in the example.
Figure 11C:
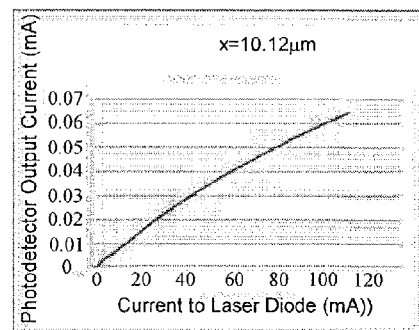
Figure 11D:
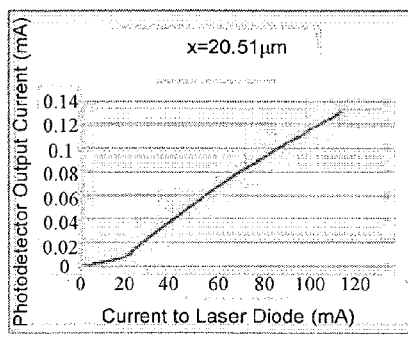
Figure 11E:
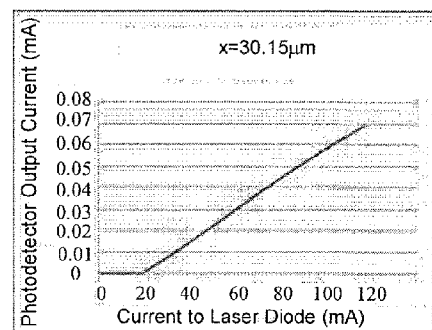

In FIG. 11E, x is about 30 µm and first emission part 32*m* of the light source substantially coincides with the edge of the light receiving part. At least part of light receiving surface 33*a* of the photodetector faces light leakage part 52*a* and receives first leakage light 51*a*. Light receiving surface 33*a* of the photodetector also overlaps part of the side of light source 32 and receives third and fourth leakage lights 51*c*, 51*d*, as well. That is, light receiving surface 33*a* of the photodetector receives the second LD light and the LED light. The graph shown in FIG. 11E is closely correlated with the graph shown in FIG. 11A, showing that the photodetector mainly detects the second LD light that leaks from first light leakage part 52*a*.

In FIG. 11C, x is about 10 µm and light leakage part 52*a* of the light source is located about 20 µm outside of the edge of the light receiving part. The output current of the photodetector has a linear relationship with the current applied to the light source, showing that the photodetector mainly detects the LED light. At least part of light receiving surface 33*a* of the photodetector faces third light leakage part 52*c* and receives third leakage light 51*c*. The output current of the photodetector is smaller than that shown in FIG. 11E in which the second LD light is detected.

In FIG. 11D, x is about 20 µm and first emission part 32*m* of the light source lies about 10 µm outside of the edge of the light receiving part. The output current of the photodetector has a substantially linear relationship with the current applied to the light source when the output current is less than about 20 mA. By contrast, when the output current of the photodetector exceeds about 20 mA, there is a rapid change in gradient that indicates the generation of oscillation. This shows the presence of a threshold current for the generation of oscillation. Thus, FIG. 11D shows that both the LED light and LD light are detected. At least part of light receiving surface 33*a* of the photodetector faces third light leakage part 52*c*, and while receiving third leakage light 51*c* (the LED light), the photodetector further receives part of first leakage light 51*a* (the second LD light) that leaks from first light leakage part 52*a*.

FIG. 11B, where x is a negative value, shows a trend that is different from the graphs shown in FIGS. 11C-11E. The output current of the photodetector is low and the LD light (reflected light of forward light L1) is substantially not detected whereas the LED light is mainly detected.

In FIG. 11E, the light receiving surface is located immediately under the light leakage part and the photodetector can detect the leakage light, which is the LD light, most efficiently. Since the relationship between the leakage light and the forward light is previously known, the intensity of the forward light can be estimated by measuring the intensity of the leakage light. Accordingly, it is possible to control the current that is applied to the light source in order to obtain the desired intensity of the forward light.

DESCRIPTION OF REFERENCE NUMERALS

1 Heat-assisted magnetic recording head
2 Magnetic head slider
31 Light source unit
32 Light source
32*m* First emission part
32*n* Second emission part
32*p* Substrate facing surface
34 First bonding layer
35 Second bonding layer
39 Substrate
52*a*-52*d* Light leakage parts

What is claimed is:
1. A light source unit comprising:
a substrate;
a light source that is mounted to the substrate, wherein the light source includes;
    a first emission part that emits a forward light, the forward light being a laser light in an oscillation state,
    a second emission part that is located on a side opposite to the first emission part and that emits a rearward light, the rearward light being a laser light in an oscillation state, and
    a light leakage part located at a position different from the first emission part and the second emission part; and
a photodetector that is provided on the substrate, wherein the photodetector has a light receiving surface for detecting a leakage light that leaks from the light leakage part.
2. The light source unit according to claim 1, wherein
the light leakage part is located on a substrate facing surface of the light source, wherein the substrate facing surface faces the substrate, and
at least part of the light receiving surface of the photodetector faces the light leakage part.
3. The light source unit according to claim 2, wherein
the light leakage part includes a first light leakage part that extends along a first side of the substrate facing surface, the first side being close to the first emission part; and a second light leakage part that extends along a second side of the substrate facing surface, the second side being close to the second emission part, and
at least part of the light receiving surface of the photodetector overlaps the first light leakage part or the second light leakage part when viewed in a direction perpendicular to the substrate.
4. The light source unit according to claim 2, wherein
the light leakage part includes a third light leakage part that extends along a third side of the substrate facing surface, wherein the third side intersects both a first side and a second side of the substrate facing surface, the first side being close to the first emission part and the second side being close to the second emission part, and at least part of the light receiving surface of the photodetector overlaps the third light leakage part when viewed in a direction perpendicular to the substrate.

5. The light source unit according to claim 3, wherein the light receiving surface of the photodetector extends to an outside of the light source when viewed in the direction perpendicular to the substrate.

6. The light source unit according to claim 4, wherein the light receiving surface of the photodetector extends to an outside of the light source when viewed in the direction perpendicular to the substrate.

7. The light source unit according to claim 1, wherein the light source includes a first side surface having the first emission part, a second side surface having the second emission part and a third side surface, the third side surface being adjacent to the substrate facing surface, the first side surface and the second side surface, and at least part of the light receiving surface of the photodetector is located outside of the light source with regard to the third side surface when viewed in a direction perpendicular to the substrate.

8. The light source unit according to claim 1, wherein the light receiving surface of the photodetector is flush with a surface of the substrate, wherein the surface of the substrate faces the light source.

9. A heat-assisted magnetic recording head comprising a magnetic head slider and the light source unit according claim 1, the light source unit being fixed to the magnetic head slider, wherein the magnetic head slider includes near-field light generation means that generates near-field light on an air bearing surface by the forward light that is emitted from the light source unit; and a recording magnetic pole that is provided adjacent to the near-field light generation means and that has one end located on the air bearing surface.

10. A light source adapted to be mounted to a substrate, the light source comprising:

a first emission part that emits a forward light, the forward light being a laser light in an oscillation state;

a second emission part that is located on a side opposite to the first emission part and that emits a rearward light, the rearward light being a laser light in an oscillation state;

a light leakage part that is located at a position different from the first emission part and the second emission part, wherein the light leakage part is located on a substrate facing surface of the substrate, wherein the substrate facing surface faces the light source; and a bonding layer that is formed on part of the substrate facing surface and that bonds the light source to the substrate, wherein a region of the substrate facing surface where the bonding layer is not provided forms the light leakage part.

* * * * *